United States Patent [19]

Rittler

[11] Patent Number: 4,836,954

[45] Date of Patent: * Jun. 6, 1989

[54] FLUORINATED PHYLLOSILICATE AND METHOD

[75] Inventor: Hermann L. Rittler, Corning, N.Y.

[73] Assignee: Corning Glass Works, Corning, N.Y.

[*] Notice: The portion of the term of this patent subsequent to Dec. 29, 2004 has been disclaimed.

[21] Appl. No.: 136,359

[22] Filed: Dec. 22, 1987

[51] Int. Cl.$^4$ .............................................. C04B 20/06
[52] U.S. Cl. .......................... 252/378 R; 252/315.2; 252/315.5; 423/118; 423/328; 423/329; 423/462
[58] Field of Search ............ 252/378 R, 315.5, 315.2; 423/118, 328, 329, 462

[56] References Cited

U.S. PATENT DOCUMENTS

| 2,982,053 | 5/1961 | Elmer . | |
|---|---|---|---|
| 3,314,772 | 4/1967 | Poole et al. . | |
| 3,508,895 | 4/1970 | Poole et al. . | |
| 3,875,288 | 4/1975 | Hoffman et al. | 423/118 |
| 4,297,139 | 10/1981 | Beall et al. . | |
| 4,624,933 | 11/1986 | Beall et al. . | |
| 4,629,485 | 12/1986 | Berkey . | |
| 4,676,929 | 6/1987 | Rittler . | |
| 4,715,987 | 12/1987 | Rittler | 501/148 |
| 4,742,039 | 5/1988 | Hanauer et al. | 252/174.15 |

FOREIGN PATENT DOCUMENTS 0140651  8/1985  European Pat. Off. .

Primary Examiner—William R. Dixon, Jr.
Assistant Examiner—Andrew Griffis
Attorney, Agent, or Firm—Clinton S. Janes, Jr.

[57] ABSTRACT

There is disclosed a fluorinated phyllosilicate material and method of producing such material. The material has fluoride ions chemically bonded to a natural phyllosilicate in part at least by exchange with hydroxyl ions. The method comprises exposing a phyllosilicate to a source of fluoride ions, either gaseous, aqueous fluoride solution, or a volatile solid, and chemically bonding flouride ions to the phyllosilicate structure. The fluorinated material may be heated to a temperature in the range of 100°–1000° C., preferably 300°–800° C. to dehydrate the material. Heating at 800° C. may create new crystal phases, such as sellaite ($MgF_2$) or fluorite ($CaF_2$).

19 Claims, 1 Drawing Sheet

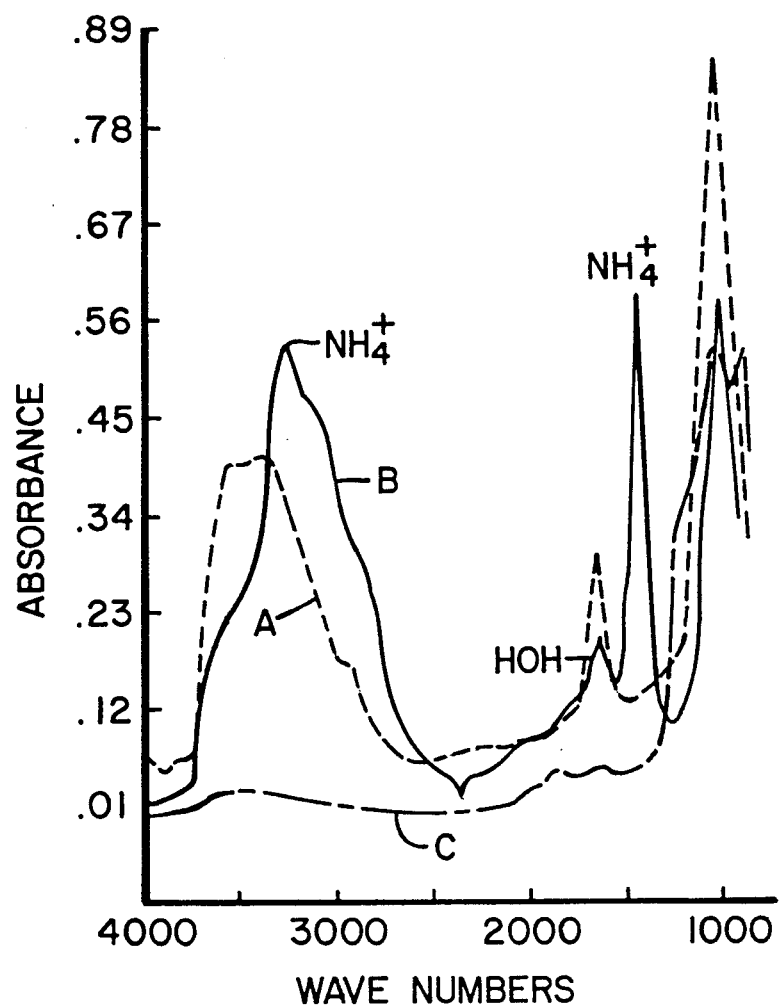

FLUORINATED PHYLLOSILICATE AND METHOD

BACKGROUND OF THE INVENTION

This invention relates to fluorinated phyllosilicate materials and their production. It is particularly concerned with incorporating fluoride ions into a phyllosilicate structure to alter the physical and chemical characteristics of the material.

Essentially any phyllosilicate, whether of natural or synthetic origin, may serve as a starting material. However, the natural materials are generally of greater interest from an economic standpoint. The silicate minerals of interest include vermiculite, beidellite, nontronite, volchonskoite, saponite, stevensite, sauconite, pimelite, bentonite, montmorillonite, hecorite, the smectites, attapulgite, sepiolite, phlogopite and biopyrobole.

Sheet silicates of the mica type are built of two units, viz., a tetrahedral sheet and an octahedral sheet. The former consists of tetrahedra of Si-O linked together to form a hexagonal network such that the bases thereof are coplanar and the apices thereof point in the same direction. This configuration yields a Si:O ratio of 2:5. In constrast, the octahedral sheet is generated through the impingement of two tetrahedral sheets pointing toward each other and crosslinked by the sharing of oxygens by Mg (or Al, Fe) in octahedral coordination. The two octahedral corners not falling in the plane of apical oxygens are occupied by hydroxyl or fluoride ions. It is possible that a composite sheet formed in this manner will be electrically neutral, in which case Van der Waals-type forces bond in to the sheets immediately above and below. More commonly, however, an excess negative charge exists due either to ion substitutions or unoccupied sites (vacancies) or a combination of both. Differences in properties arise from both the degree of charge deficiency as well as the location of the excess charge. Charge balance is restored through the uptake or foreign cations in interlayer positions in 12-fold coordination due to hexagonal rings of oxygens located in the sheets above and below.

In order to create a product from vermiculite, it is usually necessary to delaminate the particles. This involves separating the crystals at the interlayer to form high aspect ratio platelets. These may be suspended as a gel and subsequently deposited in any desired form, such as a sheet, or otherwise processed.

The silicate layer units in these minerals have a thickness of about 10 Angstrom units, with the main elemental constituents being Mg, Al, Si, and $O_2$. These silicate layers are separated by an interlayer composed of water molecules associated with cations, such as $Mg^{++}$, $Na^+$, $K^+$ and $H^+$.

The three layer micas in general, and natural vermiculite in particular, have been extensively studied because of their potential for thermal resistance and electrical insulation. The interest has been heightened considerably with the recent flight from asbestos products.

Many of the phyllosilicates, however, tend to be quite hygroscopic. Various solutions to this problem have been proposed. For example, it is known that adsorbed water molecules and hydroxyl ions may be removed by thermal treatment. This can be very effective, particularly if carried out under reduced pressure. However, there is usually a strong tendency to rehydrate after the material cools and is exposed to ambient conditions.

It has been noted that sites on phyllosilicate structures may be occupied by either hydroxyl or fluoride ions. It is also known to synthesize micas, generally structured fluormicas, and other phyllosilicate-type structures containing fluoride ions. For example, U.S. Pat. No. 4,297,139 (Beall et al.) discloses water-swellable, synthetic materials, most desirably glass-ceramic materials, which may be used to prepare gels, and, in turn, fibers, papers, films and the like. The structures of the synthetic micas and other phyllosilicates are similar to those of the naturally-occurring materials. The Beall et al. patent further discloses cation exchange in the synthetic materials of the patent.

RELATED LITERATURE

U.S. Pat. No. 4,624,933 (Beall et al.) discloses a family of synthetic mica glass-ceramic compositions based on a modified sodium fluoromontmorillonoid stoichiometry and produced by supplying excess fluoride during melting.

My U.S. Pat. No. 4,676,929 describes a method of delamination wherein a hydrated phyllosilicate is dispersed in an expanding agent, which may be a primary aminocarboxy acid, or lysine orotate, or glycylglycine. When accompanied by a shearing force, the expanding agent is effective, at ambient temperature, to separate the silicate layer units of the phyllosilicate crystal in a matter of minutes, and form a gel.

Reference is also made to my copending applications, Ser. No. 861,939, now U.S. Pat. No. 4,715,987 and Ser. No. 862,256, both filed May 12, 1986. The former describes subjecting a phyllosilicate to a cation exchange treatment before reacting it with an expanding agent, as in U.S. Pat. No. 4,676,929. The latter describes subjecting a phyllosilicate to a cation exchange treatment, plus a thermal treatment, to develop a new crystal phase which forms a solid solution.

My pending application Ser. No. 091,444 filed Aug. 31, 1987, describes a method of delaminating a phyllosilicate by heating the phyllosilicate in the presence of a reactive vapor phase, preferably a hydrogen-containing atmosphere such as forming gas. The delaminated phyllosilicate is stabilized against moisture pickup, and may have a layer of transition metal, or organic reactive sites, formed on its surface. However, extended exposure to moisture, e.g. boiling water tests, may still result in a degree of rehydration.

The following items relate to fluorination, or fluoride treatment, of glass:

U.S. Pat. No. 2,982,053 (Elmer) discloses eliminating water from a porous glass of high silica content by permeating the porous glass with a fluid comprising a fluoride-containing material to displace hydroxyl ions.

U.S. Pat. No. 3,314,772 (Poole et al.) describes improving the chemical durability of a soda lime glass surface by exposing the surface to a source of fluoride ions to produce an exchange of fluoride ions for oxygen and hydroxyl ions without etching the surface.

U.S. Pat. No. 3,508,895 (Poole et al.) describes a method of strengthening glass bodies by substituting fluorine ions for oxygen and/or hydroxyl ions in the glass surface to produce a surface layer of greater viscosity which provides a strengthening compressive layer.

U.S. Pat. No. 4,629,485 (Berkey) describes a method of making a fluorine-doped optical fiber preform. A porous glass preform is permeated with a fluorine-containing atmosphere at a temperature such that fluorine diffuses into the glass particles and the particles fuse to a dense glass.

European Patent Application, Publication Number 0140651A1 (Kyoto et al.) describes a method of producing a glass preform for optical fibers by heating a porous quartz body in a gas atmosphere containing a fluorine-based compound gas and a chlorine-based compound gas.

PURPOSES OF THE INVENTION

A primary purpose of the invention is to provide an improved means of inhibiting rehydration of a dehydrated phyllosilicate.

Another purpose is to provide a dehydrated phyllosilicate material that is stabilized against rehydration.

A further purpose is to provide a fluorinated phyllosilicate material having modified chemical and physical properties.

A still further purpose is to provide a method of chemically bonding fluoride ions to a phyllosilicate material.

Another purpose is to produce a novel phyllosilicate material containing fluroide crystal phases.

Still another purpose is to provide a phyllosilicate material capable of promoting polymerization.

A further purpose is to provide a method of treating phyllosilicates to increase their surface area.

SUMMARY OF THE INVENTION

One aspect of my invention is a method of fluorinating a phyllosilicate material which comprises exposing the phyllosilicate material to a source of fluoride ions and incorporating said fluorude ions into the phyllosilicate structure by chemical bonding. The source of fluoride ions may be a gas, an aqueous fluoride solution, or a volatile solid material mixed with the phyllosilicate. In any case, the phyllosilicate is heated to a temperature in the range of 100°–1000° C., preferably 300°–800° C., to dehydrate the material.

In another aspect, the invention is a fluorinated phyllosilicate material wherein the fluorine content of a natural phyllosilicate material, if any, is enhanced by fluoride ions chemically bonded to the phyllosilicate structure. In one embodiment, fluoride ions are exchanged for hydroxyl ions. In another embodiment, new crystal phases, such as sellaite ($MgF_2$) or fluorite ($CaF_2$) are thermally created in the phyllosilicate.

GENERAL DESCRIPTION OF THE INVENTION

The present invention derives from my discovery that fluoride ions can be introduced into, and chemically bonded to, a phyllosilicate from an external source. I have further found that fluoride ions exchange for hydroxyl ions ($OH^-$). This not only facilitates thermal dehydration, but, more importantly, because of the fluorine ion attachment, largely dissipates the tendency to rehydrate.

The invention is generally applicable to all phyllosilicates, although in varying degree. The material of greatest practical interest, however, is vermiculite. Consequently, the invention is largely described with respect to that material.

The source of fluoride ion may be any material yielding the fluoride ion. The fluorination may be carried out with a precursor aqueous fluoride solution. Thus, a solution of a fluoride compound, such as ammonium bifluoride, may be prepared and an amount of preferably powdered phyllosilicate mixed into the solution.

In this case, the fluorinated phyllosilicate may be removed and dried. Thereafter, it may be heated to a temperature in the range of 100°–1000° C. to volatilize water and varying amounts of residual organic. Such removal occurs more rapidly at a temperature of at least 300° C. While heat treatment up to 1000° C. is contemplated, most benefits can be obtained at 800° C.

In an alternative procedure, the phyllosilicate is mixed dry with a solid fluoride compound. The mixture is then heated as before. The fluoride exchange and water removal then occur in one operation and essentially simultaneously. In similar manner, the phyllosilicate may be heated in contact with a gaseous atmosphere such as trifluoromethane ($CHF_3$).

It is not known definitely how the fluoride ions enter or attach to the phyllosilicate structure. Available evidence suggests that they are covalently bonded initially. It is my belief that, in part at least, the fluoride ions displace, and effectively exchange with, hydroxyl ions originally attached to sites on the phyllosilicate structure. These sites may be provided by cations, such as $Mg^{++}$, $Ca^{++}$, or $Al^{+++}$, in the crystal structure. It also appears that ammonium ions, or other cations from a fluoride solution, become bonded to the silicate structure. Possibly, this occurs at vacant sites, thus satisfying a negative charge.

It has been observed, however, that, when a fluorinated material is heated to a temperature on the order of 800° C. or higher, a $MgF_2$ and/or $CaF_2$ crystal phase appears. This indicates that the initial covalent bonding is replaced by ionic bonding with the concomitant loss of water and, if present, ammonia. The consolidated actions may be illustrated as follows:

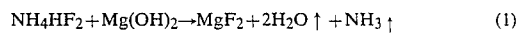

$$NH_4HF_2 + Mg(OH)_2 \rightarrow MgF_2 + 2H_2O \uparrow + NH_3 \uparrow \qquad (1)$$

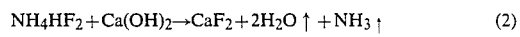

$$NH_4HF_2 + Ca(OH)_2 \rightarrow CaF_2 + 2H_2O \uparrow + NH_3 \uparrow \qquad (2)$$

The fluorination plus heat treatment may produce hydrophobic materials with fluorine contents varying up to 30 weight percent and surface areas greater than 65 square meters per gram ($M^2/gm.$) Further, if the material is heated to a temperature on the order of 800° C., new crystalline phases such as sellaite ($MgF_2$) and fluorite ($CaF_2$) are observed. The materials thus produced have an increased hardness.

Fluorine attack on silica in the phyllosilicate structure may be controlled by various precursor treatments aimed at raising the pH level, preferably to about a value of 6. Thus, preliminary delamination by the vapor phase reaction treatment described in my earlier application may be effective. Also, treatment with an aqueous hydrogen ion solution removes the interlayer of the phyllosilicate structure thereby releasing cations, such as $Mg++$, which tend to buffer the solution. The simplest, and often most effective, means is simple buffering of the aqueous fluoride solution with a base such as ammonium hydroxide. The time and temperature of the fluorination treatment, as well as concentration of the solution are also control factors.

BRIEF DESCRIPTION OF THE DRAWING

The single FIGURE in the attached drawing is a graphical illustration showing traces obtained by Fourier transform-infrared analysis of three different vermiculite samples.

SPECIFIC DESCRIPTION OF THE INVENTION

Examples 1-4

A solution of ammonium bifluoride ($NH_4HF_2$) was prepared by dissolving 57.04 grams of the fluoride compound in 1000 cc. of water. This solution was mixed with 250 grams of vermiculite ground to pass a 270 mesh screen. After 8 hours, during which the mixture was stirred, the solid vermiculite was separated, washed and dried.

Three samples of the dried material, as well as a sample of the vermiculite as received, were taken. One sample of the dry treated material was heated to 300° C. in air and held for 60 minutes. A second sample was heated to 800° C. in air and held for 60 minutes. The third sample was likewise heated to 800° C. and held, but the thermal treatment was in an (8% $H_2$) forming gas atmosphere. The as-received sample was not thermally treated.

The surface area (S.A.) on each sample was measured in terms of square meters per gram ($M^2$/gm.) by BET, nitrogen adsorption. Also, chemical composition (Comp.) of each sample was determined by wet chemical analysis. The data thus observed are set forth below in TABLE I.

TABLE I

| Treatment Temp(°C.) | Atm. | S.A. ($M^2$/gm.) | Comp. | | | | | | | | |
|---|---|---|---|---|---|---|---|---|---|---|---|
| | | | Si | Al | Mg | Fe | Ca | K | F | N | $H_2O$ |
| Blank | | <1 | 44 | 11 | 14 | 8 | 5 | 4 | 0.3 | — | 13.7 |
| 300° | Air | 60 | 22 | 11 | 23 | 7 | 5 | 1 | 30 | 4 | — |
| 800° | Air | 3 | 40 | 11 | 24 | 8 | 6 | 1 | 12 | — | — |
| 800° | $N_2H_2$ | 10 | 69 | 5 | 12 | 6 | 5 | 1 | 3 | .04 | — |

While the surface are of granular vermiculite normally measures less than one $M^2$/gm., this may increase to a value of 2-3 $M^2$/gm. when the material is pulverized to −270 mesh.

Examples 5-8

Four further samples of vermiculite were taken. One sample was an as-received control which received no treatment. Another was heated to 800° C. in a forming gas atmosphere. Still another was heated to 800° C. after a fluorination treatment as in Examples 1-4. The last sample was sintered by heating in air to 1550° C. All thermal treatments were for one hour.

Mass spectrographic analyses of total outgassing were made as each sample was heated from 25° to 1000° C. The data observed, expressed in microliters per gram ($\mu$l/gm.), are set forth in TABLE II below.

TABLE II

| Example | Treatment | Outgassing ($\mu$l/gm.) |
|---|---|---|
| 5 | Control | 23,685 |
| 6 | 800° C. $N_2/H_2$ | 4,706 |
| 7 | 1550° C. air | 2,444 |
| 8 | fluorinated 800° C. air | 1,144 |

This illustrates the degree of dehydration obtained with a fluorinated and heat treated sample. Thus, Example 8, the fluorinated material, retained less than half the amount of gas found in a highly sintered sample, and one twentieth of that in the original material. It was observed that a magnesium silicate crystal phase appeared in the sample sintered at 1550° C.

Examples 9-11

A 2M solution of ammonium bifluoride was prepared and mixed with −270 vermiculite. The mixture was allowed to stand with continuous stirring for 72 hours. The vermiculite was separated and heated to 300° C. in air and held at that temperature for 3 hours.

A second mixture was prepared and treated in the same manner with two exceptions. The mixture was allowed to stand overnite with continuous stirring. Following the heat treatment for 3 hours at 300° C., the vermiculite was then heated to 800° C. and held one hour.

Both of the materials prepared as just described, and a third sample of as-received vermiculite, were analyzed by Fourier transform-infrared (FT-IR) analysis. The traces thus obtained are reproduced in the accompanying drawing where A designates the trace for the as received material; B designates the trace for the material heated to 300° C.; and C designates the material heated to 800° C. On trace B, two peaks indicating $NH_4^+$, and one indicating HOH, are labeled accordingly. It will be observed that these have disappeared from trace C. In the drawing, Absorbance is plotted along the vertical ordinate, and Wave Number along the horizontal abscissa.

Examples 12-13

Two dry mixtures of vermiculite and ammonium bifluoride were prepared. One sample consisted of 10% ammonium bifluoride and 90% vermiculite; the other was a 30-70% mixture. Both mixtures were heated in air to 1000° C. and held for one hour. In the course of this thermal treatment, the vermiculite was both fluorinated and delaminated.

Both fired products were analyzed by X-ray diffraction. In each analysis, peaks characteristic of sellaite ($MgF_2$) were observed at the following d-spacings in Angstrom units (A) and relative intensities (R.I.)

| 10-90(%) | | 30-70(%) | |
|---|---|---|---|
| Peak(Å) | R.I.(%) | Peak(Å) | R.I.(%) |
| 1.453 | 20 | 1.452 | 34 |
| 1.529 | 15 | 1.531 | 20 |
| 1.713 | 17 | 1.723 | 38 |
| 2.231 | 49 | 2.227 | 45 |

Examples 14-15

Two mixtures were prepared, one of 30% dry ammonium bifluoride and 70% sepiolite, the other of 30% dry ammonium bifluoride and 70% talc. Each mixture was heated in air to 800° C. and held at that temperature for 16 hours. In the course of this thermal treatment, the sepiolite and talc were both fluorinated and delaminated.

Both fired products were analyzed by X-ray diffraction. The peaks characteristic of sellaite, and their relative intensities (R.I.), are listed below for each analysis.

| Sepiolite | | Talc | |
|---|---|---|---|
| Peak(Å) | R.I. | Peak(Å) | R.I. |
| 1.526 | 31% | 1.528 | 46% |
| 1.712 | 88% | 1.716 | 7% |
| 2.231 | 100% | 2.232 | 28% |

I claim:

1. A method of modifying a 3-layer phyllosilicate material which comprises providing a 3-layer phyllosilicate material having ion bonding sites on its surface, at least a portion of which are occupied by hydroxyl ions, and exposing the phyllosilicate material to an external source of fluoride ions, whereby fluoride ions from such source occupy said ion bonding sites in exchange for hydroxyl ions on the surface of the 3-layered phyllosilicate material without change in the phyllosilicate layered crystal structure.

2. A method in accordance with claim 1 wherein at least a portion of the fluoride ions are covalently bonded to sites on the phyllosilicate material.

3. A method in accordance with claim 1 wherein the source of fluoride ions is an aqueous fluoride solution.

4. A method according to claim 1 wherein the ion exchanged phyllosilicate material is heated at a temperature within the range of 100°–1000° C. to dehydrate the material.

5. A method according to claim 4 wherein the temperature range is 300°–800° C.

6. A method according to claim 3 wherein the solution is buffered with a basic material to minimize silica attack.

7. A method according to claim 6 wherein the buffer is ammonium hydroxide.

8. A method in accordance with claim 1 wherein the phyllosilicate material is subjected to a delaminating treatment before being subjected to fluoride ion exchange.

9. A method according to claim 8 wherein the delaminating treatment involves heating at a temperature between 300°–1000° C. in a neutral or reducing atmosphere containing a reactive vapor phase.

10. A method according to claim 1 wherein the source of fluoride ion is a volatile solid material, the solid material is mixed with the phyllosilicate, and the mixture is heated to a temperature between 100°–1000° C. to effect the ion exchange and dehydration simultaneously.

11. A method according to claim 1 wherein the source of fluoride ions is ammonium bifluoride.

12. A method according to claim 1 wherein the fluorinated phyllosilicate is heated to at least 800° C.

13. A method according to claim 12 wherein the phyllosilicate is talc and a sellaite crystal phase is formed in the thermal treatment.

14. A method according to claim 12 wherein the phyllosilicate is vermiculite and a sellaite crystal phase is formed in the thermal treatment.

15. A dehydrated, modified phyllosilicate material wherein a fluoride ion content is imparted to or the original fluorine content is enhanced in the phyllosilicate surface normally occupied by hydroxyl ions, the hydroxyl ion content being correspondingly reduced, the material being resistant to re-hydration and the material retaining its original layered phyllosilicate crystal structure.

16. A synthetic phyllosilicate material in accordance with claim 15 wherein the content of hyroxyl ion in the phyllosilicate is reduced in amount and a content of fluoride ions is exchanged for such hydroxyl ions.

17. A synthetic phyllosilicate material in accordance with claim 15 wherein at least a portion of the fluoride ions are covalently bonded to sites on the phyllosilicate.

18. A fluorinated phyllosilicate material in accordance with claim 15 wherein the material contains a sellaite ($MgF_2$) crystal phase.

19. A fluorinated phyllosilicate material in accordance with claim 15 wherein the material contains a fluorite ($CaF_2$) crystal phase.

* * * * *